United States Patent [19]

Salmon et al.

[11] Patent Number: 4,802,605
[45] Date of Patent: Feb. 7, 1989

[54] HINGE FOR CABLE ROUTING

[75] Inventors: Michael E. Salmon, Flint; John E. Nemazi, Troy, both of Mich.

[73] Assignee: GMI Engineering & Management Institute, Flint, Mich.

[21] Appl. No.: 34,068

[22] Filed: Apr. 2, 1987

[51] Int. Cl.⁴ .............................................. B65D 43/14
[52] U.S. Cl. ................................... 220/338; 220/342; 16/267
[58] Field of Search .............. 220/338, 341, 342, 343, 220/340; 16/265, 267, 366, 266

[56] References Cited

U.S. PATENT DOCUMENTS

| | | | |
|---|---|---|---|
| 3,402,422 | 9/1968 | Baer | 16/366 |
| 3,680,927 | 8/1972 | Neureothcer | 16/267 |
| 4,663,803 | 5/1987 | Gora | 220/340 |
| 4,676,375 | 6/1987 | Willems et al. | 220/340 |
| 4,684,017 | 8/1987 | Watanabe et al. | 220/342 |
| 4,729,475 | 3/1988 | Kurkjian et al. | 220/341 |

OTHER PUBLICATIONS

Toshiba advertisement pp. 2-3, 12-13 Venture Magazine 2-1987.
Micronta advertisement by Tandy Corportion 12-7-1987.

Primary Examiner—Joseph Man-Fu Moy
Attorney, Agent, or Firm—Brooks & Kushman

[57] ABSTRACT

Pivotably connecting a first and second housing to allow limited relative rotation along a hinge axis, having a first member provided with a sealing surface and a circumaxial slot extending about the hinge axis projecting into the first housing. The second pivot member sealingly cooperates with the first pivot member and has a port formed therein aligned with the circumaxial slot and extending into the second housing for providing an internal routing for a cable. Attachment means are also provided to axially align and pivotably retain the first and second pivot members.

20 Claims, 3 Drawing Sheets

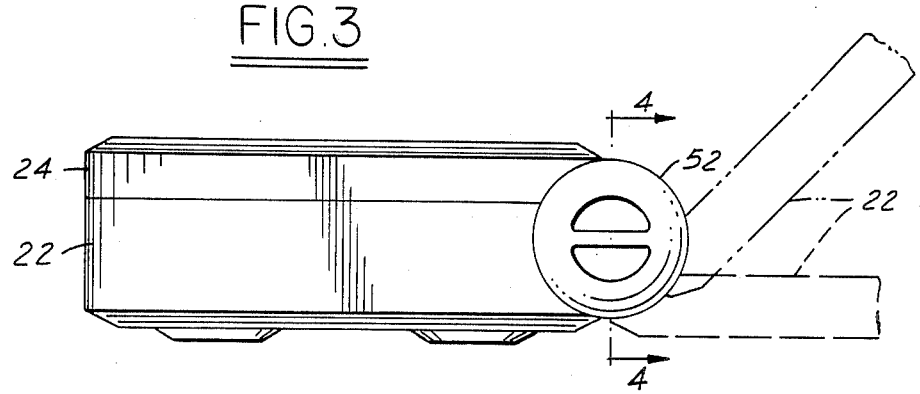
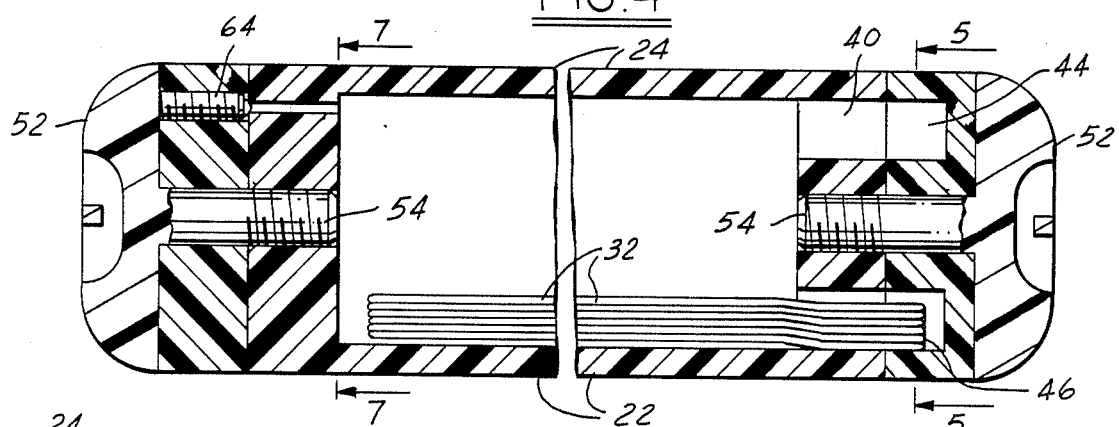
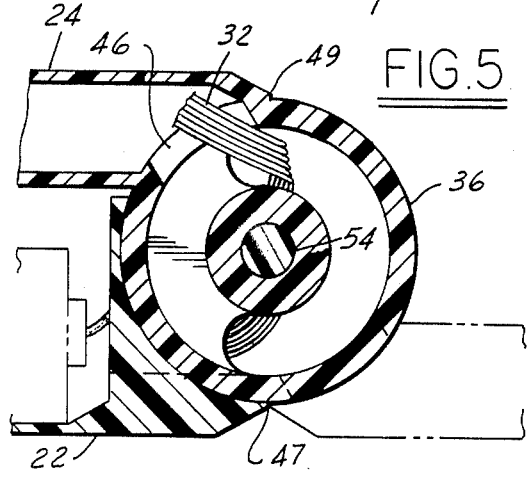
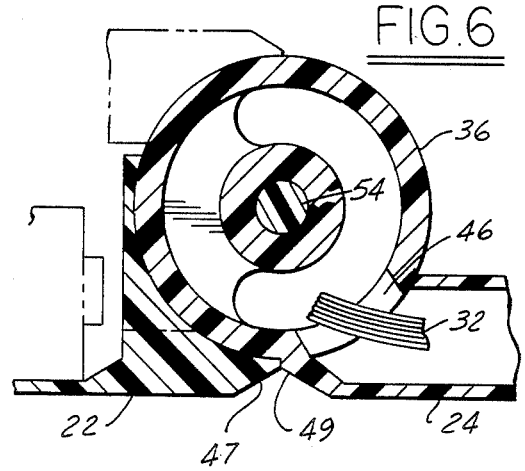
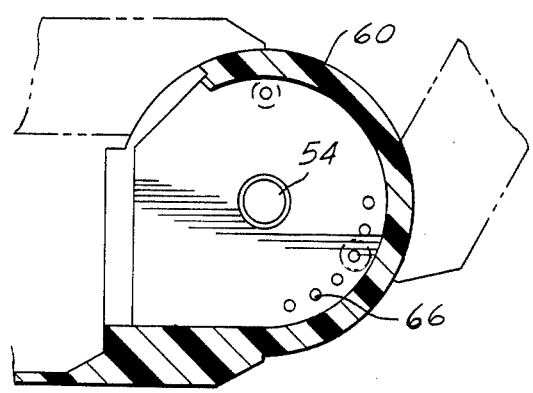

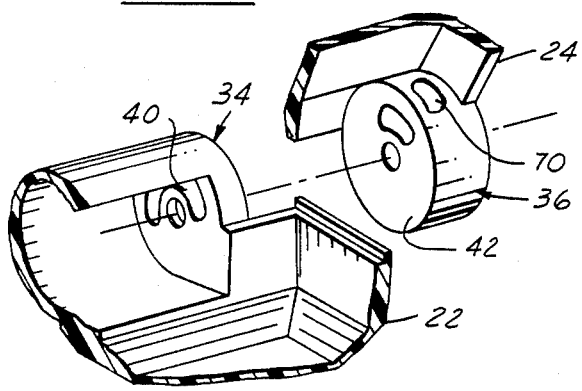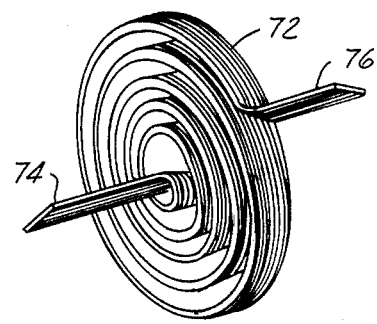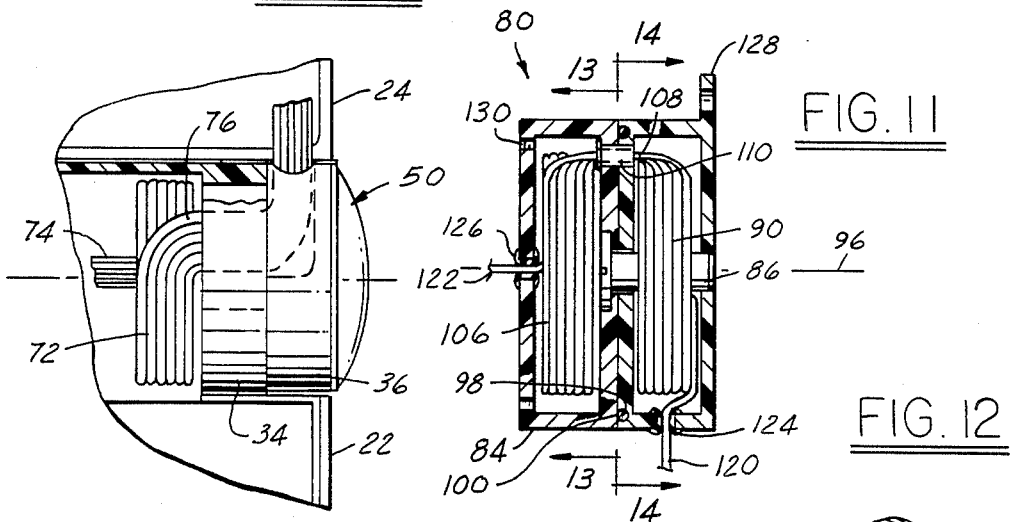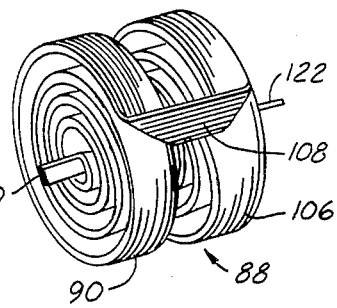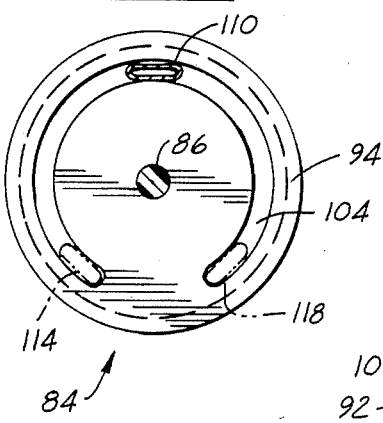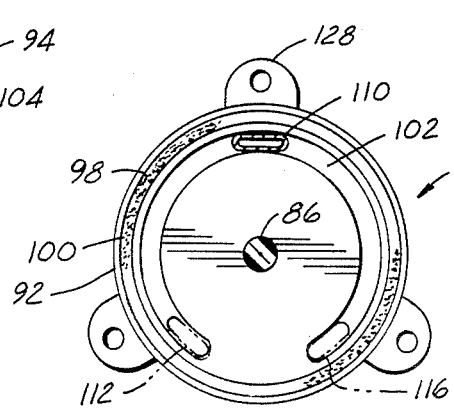

HINGE FOR CABLE ROUTING

BACKGROUND OF INVENTION

This invention relates to hinges and more specifically to hinges provided with an internal passageway for routing a cable or the like.

Many electrical devices are currently sold which require a cable to be routed between two members pivotably attached to one another. Frequently in electrical devices such as lap top computers, and volt/amp meters it is common to rout the cable externally to dramatically limit the rotation of the two hinged parts, or to provide elaborate multi-pieced hinge mechanisms to prevent the electrical cable connecting the two members from fatiguing in normal usage. Cable routing is particularly a problem when wide ribbon cable commonly used in the computers is routed between the computer base and the flip-up housing containing the video display.

An object of the present invention is to provide a simple hinge mechanism with an internal routing for a cable. Another object of the invention is to enable the hinge to move through an 180° arc without fatiguing the cable. These and other features and advantages of the present invention are disclosed in the accompanying specification and claims. While the preferred embodiment discloses an electrical apparatus, it should be noted that the hinge can also be used for routing fiber optic cable and the term cable is utilized in a broad fashion.

SHORT STATEMENT OF INVENTION

Accordingly a hinge of the present invention provides a pivotable connection between a first and second housing to allow limited relative rotation therebetween while providing an internal routing for a cable or the like. The hinge has a first pivot member affixed to the first housing having a seal surface and a circumaxial slot extending partially about the hinge axis and projecting through the pivot member into the first housing. Sealingly engaging the first pivot is a second pivot affixed to the second housing having a mating sealing surface provided with a port formed therein aligned with the circumaxial slot. The port extends from the circumaxial slot into the second housing to provide an internal routing for a cable between the first and second housings. Attachment means to affix a first and second pivot member together and proper axial alignment is also provided.

BRIEF DESCRIPTION OF THE DRAWINGS

FIG. 3 is an end view of the FIG. 1 device showing the first housing in several alternative positions;

FIG. 4 is an enlarged cross-sectional view taken along the line 4—4 of FIG. 3;

FIG. 5 is a sectional view of the device in the closed position taken along line a—a of FIG. 4;

FIG. 6 is a cross-sectional view of the device in the opened position taken along line a—a of FIG. 4;

FIG. 7 is a cross-sectional view of the device taken along line 7—7 of FIG. 4;

FIG. 8 is a partial perspective view showing an alternating embodiment of the hinge;

FIG. 9 is a perspective view of an alternative helical cable arrangement;

FIG. 10 is a cut away view of a hinge employing a cable of the type shown in FIG. 9;

FIG. 11 is a cross sectional side elevation of an alternative embodiment of the invention;

FIG. 12 is a perspective view showing the cable configuration used in FIG. 11 embodiment;

FIG. 13 is a sectional view taken along line 13—13 of FIG. 11; and

FIG. 14 is a sectional view taken along line 14—14 of FIG. 11.

DETAILED DESCRIPTION OF THE PREFERRED EMBODIMENT

Figure 1:
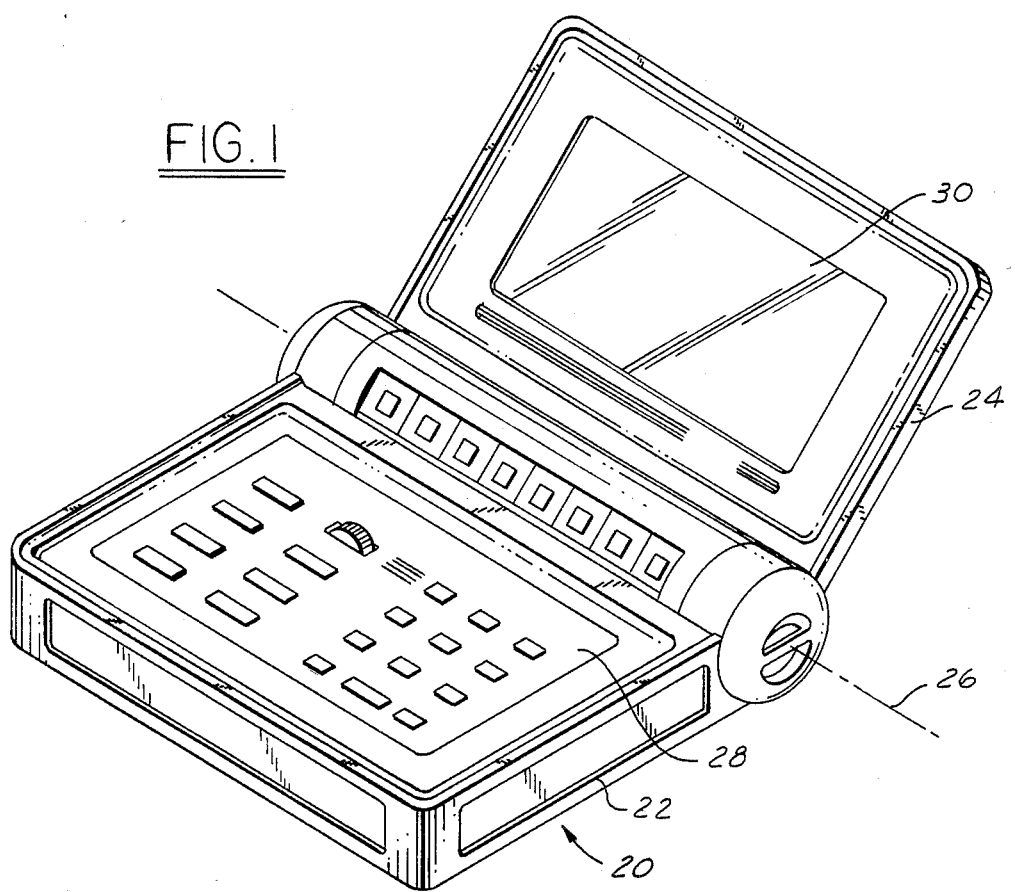
FIG. 1 is a perspective view of a lap top electrical device employing the present hinge invention.

The preferred embodiment of the invention is illustrated by way of examples in FIGS. 1-7. An electrical device 20 in the form of a lap top instrument is provided with a first housing 22 and a second housing 24 pivotably attached to one another along hinge axis 26 in the sample device shown, the first housing is provided with a keypad 28 and a second housing is provided with a liquid crystal display 30. The first housing is capable of moving relative to the second housing approximately 180° from a closed position to a full open position. Alternatively the two housings may be left at some intermediate position as shown in FIG. 1 which the user finds convenient.

Figure 2:
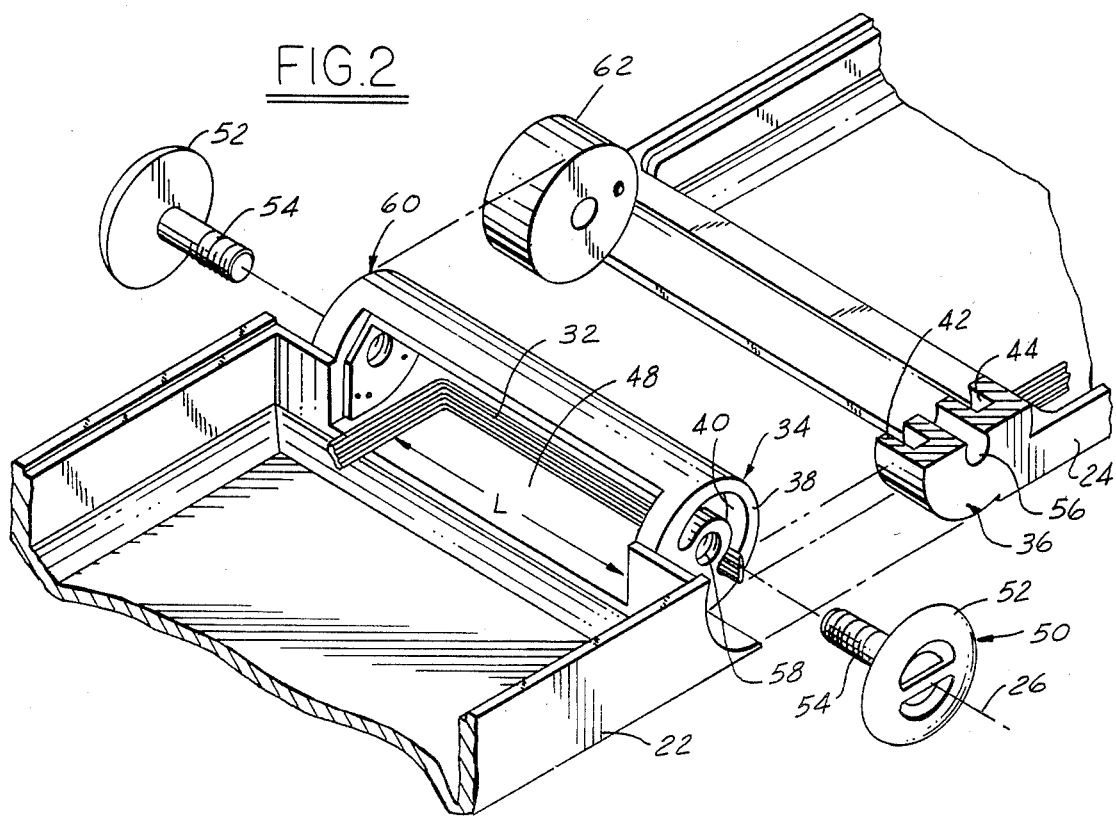
FIG. 2 is an exploded, cut away perspective view of the FIG. 1 device.

The internal structure of the hinge can be better seen in the exploded drawing of FIG. 2. Keypad 28 and liquid crystal display 30 as well as the other associated electronic components within the respective housings are removed to better show the structure. Cable 32 extends from first housing 22 through a first pivot 34 into a second pivot 36 in the second housing 24. First pivot member 34 is affixed to housing 22 and is provided with a generally flat seal surface 38 which is perpendicular to the horizontal axis 26, and a seal surface 38 which extends concentrically about the hinge axis. First pivot member 34 is also provided with a circumaxial slot 40 which is formed therein and extends partially about the hinge axis projecting into the interior of the first housing 22. Preferably the circumaxial slot will extend to arc greater than 180° to provide ample clearance for cable movement.

Second housing 24 is provided with a second pivot member 36 which pivotably cooperates with the first pivot member. Second pivot member 36 is provided with a seal surface 42 which extends concentrically about the hinge axis and sealingly engages seal surface 38 formed in first pivot member 34. The second pivot member is provided with a port which extends from a region generally adjacent seal surface 42 to the second housing to provide a space for routing a cable. In the embodiment of the invention shown in FIGS. 1-7 the port is formed of a generally arcuate groove 44 and radial passageway 46. It is important to note that a number of alternative port arrangements could work equally as well as the arcuate groove 44, radial passageway 46 combination. The port extends from inside the second housing through the second pivot member and opens into the plane of seal surface 42 generally aligned with the circumaxial slot in the first pivot member.

Sealing surfaces 38 and 42 mate with one another in a manner to prevent dirt and dust from entering the apparatus case. When the case is incorporated into an electrical device which is intended for outdoor usage, it may be desirable to incorporate an 0-ring between sealing surfaces 38 and 40 lying in a 0-ring groove formed in at least one of such surfaces to positively prevent dirt or moisture from entering the device. An 0-ring arrangement to facilitate such a seal is shown in the alternative hinge embodiment of FIGS. 11-14.

To limit the travel of the two pivot members relative to one another, the hinge may be provided with stop means to limit the maximum range of travel when the first and second housings are rotated relative to one another in one direction. The stop means employed in the FIGS. 1-7 embodiment are a pair of stops 47 and 49 which are integrally formed into the first and second housings 22 and 24. FIG. 6 shows the case in the open position with stops 47 and 49 engaging one another. The stops prevent the over rotation of the hinge and the shearing of the cable.

As shown in FIGS. 2 and 4 the first housing is preferably provided with an internal cavity 48 generally lying along a hinge axis 26 for retaining a length of cable 34 which freely extends from slot 40 generally parallel to the hinge axis for a substantial length of L. Length L is selected so that it is sufficient to prevent the cable from fatiguing in normal usage. Note as the first and second members are pivoted relative to one another the cable extending out of the port formed in the second pivot member 36 moves arcuately through circumaxial slot 40 resulting in the cable over length L being twisted about its longitudinal axis which is approximately aligned with hinge axis 26. Since the arcuate slot does not lie on the hinge axis, but is spaced radially therefrom, the cable will move in a slight conical path as opposed to a pure twisting motion.

The hinge is further provided with an attachment means for attaching the first and second pivot members together in axial alignment to allow limited pivotable motion therebetween. In the embodiment depicted in the drawings, bolt 50 serves as an attachment means. Bolt 50 has an enlarged head 52 and a threaded shaft 54. Shaft 54 projects freely through port 56 in the second pivot member and threadingly engages the threaded hole 58 in the first pivot member 34. Second pivot member 36 is sandwiched between the first pivot member 34 and bolt 50 as shown in FIG. 4 and is free to rotate about the bolt shaft 54.

In most applications the hinge will be provided with a third pivot member 60 affixed to the first housing 22 and fourth pivot member 62 affixed to the second housing 24 for rotably cooperating with each other along the hinge axis. The third and fourth pivot members are spaced axially from the first and second pivot members to securely attach the first and second housings together. The third and fourth pivot members are preferably provided with detent means for temporarily retaining the first and second housings at selected angular positions relative to one another. The fourth pivot member 62 is provided with a spring loaded ball 64 which engages any one of a number of a detent indentations 66 formed in third pivot member 60. Spring loaded ball 64, is a commercially available unit in the form of a set screw having an internal cavity containing a spring and a ball. The spring loaded ball assembly is threadingly attached to the fourth pivot member as shown.

A case for electronic device or the like of the present invention is shown in FIG. 3 with the second housing member in several alternative positions, closed, opened 135° and open 180°. The position of the cable when the case is closed and opened is shown in FIGS. 5 and 6 respectively. As previously mentioned the arcuate groove and radial passageway port design as depicted in FIGS. 1-7 is merely one way of forming the internal port in a second pivot member. Having the arcuate groove 44 enables for easy assembly and disassembly of the first and second housings relative to one another with the cable in place. An alternative port of design is shown in FIG. 8 without the arcuate groove. Port 70 extends from within the second housing to the plane of a seal surface 42 and is aligned with the circumaxial slot 40 in the first pivot member. Using a port design as shown in FIG. 8 the cable would be routed through the hinge after the first and second housings are attached together.

An alternative spirally wound cable 72 is shown in FIG. 9. Rather than having the cable extend over length L as shown in the first embodiment, the spiral cable 72 provides a compact cable arrangement which likewise provides a sufficient length of cable so that cable stress can be minimized. The flat ribbon cable is rolled in a spiral manner, having a first end 74 projecting from the center of the spiral and second end 76 projecting from the outer periphery of the spiral. The spiral cable is shown in FIG. 10 mounted adjacent the hinge. The spiral cable second and 76 extends through the circumaxial slot formed in the first pivot 34 in a manner similar to cable 32 shown in FIGS. 2 and 4-6. Rather than twisting the cable in a torsion as cable second and 76 is moved along the arcuate path of circumaxial slot 40, the spiral is wound tighter or looser in a manner similar to a clock spring. The spiral cable is wound about the hinge axis 26.

An alternative embodiment of the hinge is shown in FIGS. 11-14. The hinge shown is a separate unit which can be used for a wide variety of purposes. The hinge could be used to fabricate a case for an electrical device or the like or, the hinge could be used for pivotably mounting an electrical device to a fixed structure, such as mounting a computer monitor or a video camera onto a base or an articulated arm. The hinge assembly 80 is comprised of a first pivot member 82 and a second pivot member 84 held together by bolt 86 which serves as means to attach the first and second pivot members together in axial alignment allowing limited pivotable movement therebetween. First pivot member 82 is provided with an internal, generally cylindrical cavity for retaining cable 88 first spirally wound portion 90. The first pivot 82 is provided with a seal surface 92 and second pivot 84 is provided with a seal surface 94 which are concentric and perpendicular to hinge axis 96 about which the first and second pivots relatively rotate. Sealing surface 92 is provided with an 0-ring groove 98 into which 0-ring 100 fits. The first pivot 82 is provided with a circumaxial seal slot 102 which extends concentrically about the hinge axis through an arc which is significantly less than 360°. Slot 102 extends from adjacent the first seal surface into the internal cavity within the first pivot which retains cable of first spiral portion 90. Radially aligned with the first circumaxial slot in the first pivot is a second circumaxial slot 104 formed in the second pivot. The slot again preferably extends through a substantial arc which is significantly less than 360°. A cable second spiral portion 106 is oriented within the internal cavity in the second pivot. The first and second cable spiral portions 90 and 106 are connected by a central cable portion 108. Central cable portion 108 extends between the internal cavities in the first and second pivot through circumaxial slots 102 and 104.

The device is preferably provided with a tubular stop 110 through which the cable portion 108 is routed.

Tubular stop 110 projects through, and cooperates with, circumaxial slots 102 and 104. Tubular stop 110 provides a positive stop limiting the relative rotation of the first and second housings when rotated in either extreme direction, thereby preventing any shear load from being exerted on the cable do to over rotation. By utilizing an arcuate slot in both the first and second pivots, it is capable of achieving greater than 360° of rotation. At the full counter clockwise orientation, stop 110 is oriented at position 112 in the first circumaxial slot and at position 114 in the second circumaxial slot. At the full clockwise orientation, stop 110 is oriented at position 116 in the first circumaxial slot and position 118 in the second circumaxial slot. In the embodiment of the invention shown slot 102 and 104 each extend sufficiently about the axis of the hinge to enable stop 110 to move through a 270° arc which enables the hinge to move through a total included arc of 540°. Total travel could be increased somewhat, however, structional integrity may be sacrificed slightly. Total angle of rotation could, of course, be reduced to achieve any lesser desired maximum range of travel by accordingly limiting the lengths of circumaxial slots 102 and 104.

Cable 88 is provided with a first and 120 and a second and 122 which project out of the first and second pivots through the grommets 124 and 126 respectively. It should be appreciated that these outlets may be oriented in any desired position to suit the particular design application. The hinge 80 is further provided with mounting flange 128 associated with the first pivot, and threaded holes 130 associated with the second pivot to facilitate the attachment of the hinge to any desired components. It should also be appreciated that any number of alternative methods for mounting the hinge may be utilized.

It will be understood, of course, that while the form of the invention herein shown and described constitutes a preferred embodiment of the invention, it is not intended to illustrate all possible forms thereof. It will also be understood that the words used are words of description rather than limitation and various changes may be made without departing from the spirit and scope of the invention disclosed.

We claim:

1. A hinge for pivotably connecting a first and second housing, to allow limited relative rotation therebetween along a hinge axis while providing an internal routing for a cable or the like therebetween, said hinge comprising:
   a first pivot member affixed to the first housing said pivot member having a seal surface, generally concentric with the hinge axis and circumaxial slot formed in the pivot member sealing suface and extending partially about said hinge axis projecting through the pivot member into the first housing;
   a second pivot member affixed to the second housing having a sealing surface for engaging the first pivot member sealing surface, said second pivot member having a port formed therein aligned with the circumaxial slot and extending into the second housing providing an internal routing for a cable between the first and second housings; and
   attachment means to attach the first and second pivot members in axial alignment and allowing limited pivotable motion therebetween.

2. The invention of claim 1 wherein said first and second pivot member sealing surfaces further comprise a pair of planar surfaces generally perpendicular to the hinge axis.

3. The invention of claim 1 wherein the circumaxial slot formed in the first pivot member extends arcuately about the hinge axis through an angle of at least 180° to allow the first and second members to be rotated 180° without unduly flexing the cable routed therethrough.

4. The invention of claim 1 wherein the port in the said second pivot member further comprises an arcuate groove formed therein aligned with said circumaxial slot, and having a radial passageway projecting from the arcuate groove radially.

5. The invention of claim 1 wherein said attachment means further comprises a bolt having a first end, a central shaft and an enlarged second end, said bolt lying along the hinge axis and having the first end affixed to one of said pivot members, while the shaft pivotably projects through and the head cooperates with the other pivot member.

6. The invention of claim 1 wherein the port formed in the second pivot member further comprises a second circumaxial slot aligned with the circumaxial slot of the first pivot member to allow rotation of the first and second members relative to one another through an angle greater than 360°.

7. The invention of claim 6 further comprising a stop projecting through the circumaxial slots formed in the first and second pivot members and shiftable relative thereto, to limit the maximum range of travel of the first and second housings relative to one another when rotated in either direction, thereby preventing sharing of the cable routed therebetween.

8. The invention of claim 1 further comprising stop means to limit the maximum range of travel of the first and second housings relative to one another when rotated in one direction.

9. The invention of claim 1 further comprising a third pivot member affixed to the first housing and a fourth pivot member affixed to the second housing, rotably cooperating with each other and lying along the hinge axis spaced axially from the first and second pivot members to securely attach the first and second housings together.

10. The invention of claim 9 wherein third and fourth pivot members are each provided with generally parallel mating surfaces perpendicular to said hinge axis.

11. The invention of claim 9 further comprising detent means for temporarily retaining the first and second housings at selected angular positions relative to one another.

12. The invention of claim 9 wherein said first housing is provided with a internal cavity lying along the hinge axis between the first and third pivot members for retaining a length of cable freely extending from the circumaxial slot generally parallel to the hinge axis, the said length being sufficient so that the cable will be twisted about the hinge axis as the two housings are moved relative to one another and will not fatigue in normal usage.

13. A case for an electronic device or the like comprising:
   a first housing member;
   a second housing member pivotably attached to the first housing member to allow limited relative rotation therebetween along a hinge axis;

a first pivot member affixed to the first housing said pivot member having a seal surface, generally concentric with the horizontal axis and circumaxial slot formed in the pivot member sealing surface and extending partially about said horizontal axis projecting through the pivot member into the first housing;

a second pivot member affixed to the second housing having a sealing surface for engaging the first pivot member sealing surface, said second pivot member having a port formed therein aligned with the circumaxial slot and extending into the second housing providing an internal routing for a cable between the first and second housings; and attachment means to attach the first and second pivot members in axial alignment and allowing limited pivotable motion therebetween.

14. The invention of claim 13 wherein the circumaxial slot formed in the first pivot member extends arcuately about the hinge axis through an angle of at least 180° to allow the first and second members to be rotated 180° without unduly flexing the cable routed therethrough.

15. The invention of claim 13 wherein said attachment means further comprises a bolt having a first end, a central shaft and an enlarged second end, said bolt lying along the hinge axis and having the first end affixed to one of said pivot members, while the shaft pivotably projects through and the head cooperates with the other pivot member.

16. The invention of claim 13 further comprising stop means to limit the maximum range of travel of the first and second housings relative to one another when rotated in one direction.

17. The invention of claim 13 further comprising a third pivot member affixed to the first housing and a fourth pivot member affixed to the second housing, rotably cooperating with each other and lying along the hinge axis spaced axially from the first and second pivot members to securely attach the first and second housings together.

18. The invention of claim 17 further comprising detent means for temporarily retaining the first and second housings at selected angular positions relative to one another.

19. The invention of claim 17 wherein said first housing is provided with a internal cavity and lying along the hinge axis between the first and third pivot members for retaining a length of cable freely extending from the circumaxial slot generally parallel to the hinge axis, the said length being sufficient so that the cable will be twisted about the hinge axis as the two housings are moved relative to one another and will not fatigue in normal usage.

20. A case for an electronic device or the like comprising:

a first housing member; and a second housing member pivotably attached to the first housing member to allow limited relative rotation therebetween along a hinge axis;

a first pivot member affixed to the first housing said pivot member having a seal surface, generally concentric with the horizontal axis and circumaxial slot formed in the pivot member sealing suface and extending partially about said horizontal axis projecting through the pivot member into the first housing;

a second pivot member affixed to the second housing having a sealing surface for engaging the first pivot member sealing surface, said second pivot member having a port formed therein aligned with the circumaxial slot and extending into the second housing providing an internal routing for a cable between the first and second housings; and a third pivot member affixed to the first housing and a fourth pivot member affixed to the second housing rotably cooperating with each other and lying along the hinge axis based axially from the first and second pivot members to securely attached the first and second housings together said first housing being provided with a cavity lying between the first and second pivot members along the hinge axis for retaining a lengthy cable which freely extends into said cavity from a circumaxial slot lying generally parallel to the horizontal axis and having a length sufficient so that the cable will be twisted about the hinge axis as the first and second housings are moved relative to one another and will not fatigue in normal usage.

* * * * *